United States Patent [19]

Kaufman et al.

[11] Patent Number: 4,751,062

[45] Date of Patent: Jun. 14, 1988

[54] FUEL CELL WITH ELECTROLYTE MATRIX ASSEMBLY

[75] Inventors: Arthur Kaufman, West Orange; Sheldon Pudick, Sayreville; Chiu L. Wang, Edison, all of N.J.

[73] Assignee: Engelhard Corporation, Menlo Park, N.J.

[21] Appl. No.: 914,023

[22] Filed: Oct. 1, 1986

[51] Int. Cl.$^4$ ............................................. H01M 2/00
[52] U.S. Cl. ........................................ 429/34; 429/41; 429/44
[58] Field of Search ................... 429/41, 34, 46, 38, 429/44, 45

[56] References Cited

U.S. PATENT DOCUMENTS

| | | | |
|---|---|---|---|
| 3,481,737 | 12/1969 | Siebenberg et al. | 429/41 |
| 3,575,718 | 4/1971 | Adlhart et al. | 429/46 |
| 4,017,664 | 4/1977 | Breault | 429/44 |
| 4,276,356 | 6/1981 | Baker | 429/41 |
| 4,467,019 | 8/1984 | Feigenbaum | 429/34 |
| 4,529,671 | 7/1985 | Kahara et al. | 429/41 |

Primary Examiner—Anthony Skapars

[57] ABSTRACT

This invention is directed to a fuel cell employing a substantially immobilized electrolyte imbedded therein and having a laminated matrix assembly disposed between the electrodes of the cell for holding and distributing the electrolyte. The matrix assembly comprises a non-conducting fibrous material such as silicon carbide whiskers having a relatively large void-fraction and a layer of material having a relatively small void-fraction.

9 Claims, 2 Drawing Sheets

FUEL CELL WITH ELECTROLYTE MATRIX ASSEMBLY

BACKGROUND OF THE INVENTION

This invention relates to fuel cells and, more particularly, to a fuel cell employing a substantially immobilized electrolyte imbedded therein and having a laminated matrix assembly disposed between the electrodes of the cell for holding and distributing the electrolyte. As defined herein, a substantially immobilized electrolyte is an electrolyte contained within the matrix assembly in such a manner that permits the migration of the electrolyte within the layers of the matrix while at the same time prohibiting the free flow of the electrolyte out of the matrix. The matrix comprises at least two layers of material wherein at least one of the lamina comprises a non-conducting fibrous material such as silicon carbide whiskers and wherein the individual lamina have differing void morphologies for distributing electrolyte into the region between the electrodes, the electrolyte being used in connection with the generation of electricity.

Much research is being done in the area of fuel cell technology in order to provide ever increasing amounts of electric power and for operating such cells over longer periods of time without any need for shutdown to accomplish maintenance. As compared to other methods of generation of electric power from combustible fuels, a fuel cell has a higher efficiency and is also characterized by a simplicity of physical structure in that such cells can be constructed without any moving parts.

While a variety of electrochemical reactions are known for the conversion of fuel into electricity, one well-known form of cell utilizes the reaction between oxygen and hydrogen, the hydrogen serving as the fuel. One common form of construction for the hydrogen-oxygen cell is the laminated structure wherein the electrodes are spaced apart by a porous layer of material which holds an electrolyte, the porous layer being of such a structure that the electrolyte becomes a quasi solid. Concentrated phosphoric acid is an example of a suitable electrolyte. The hydrogen is guided by passageways behind the active region of the anode and the oxygen is guided by passageways behind the active region of the cathode. At the anode, the hydrogen gas dissociates into hydrogen ions plus electrons in the presence of a catalyst, typically a precious metal such as platinum or platinum with other metals. The hydrogen ions migrate through the electrolyte to the cathode in a process comprising ionic current transport while the electrons travel through an external circuit to the cathode. In the presence of a catalyst at the cathode, the hydrogen ions, the electrons, and molecules of oxygen combine to produce water.

In order to provide for the physical placement of the respective reactants at the catalyst layers of the anode and cathode, layers of materials having hydrophilic and hydrophobic properties are disposed in an arrangement contiguous to the catalyst layers. They permit the electrolyte and the oxygen at the cathode and hydrogen at the anode to contact the catalyst layer. The hydrophobic material is provided with pores of sufficiently large size to permit the gaseous hydrogen and the gaseous oxygen to freely flow through the material so as to come into contact with the catalyst.

Details of the construction of fuel cells, and of the component parts thereof, are disclosed in U.S. Pat. Nos. 3,453,149 of Adlhart and 4,064,322 of Bushnell. These two patents show structures for guiding the gaseous reactants into the regions of the catalyst. In addition, the Bushnell patent discloses a space within a cell for the storage of electrolyte so as to compensate for any changes in the quantity of electrolyte available for ion transport. An assembly which combines together a plurality of fuel cells into a single power source is disclosed in U.S. Pat. No. 4,175,165 of Adlhart. This patent also discloses a manifold for the simultaneous feeding of the reactant gases to the cathode and anode of the respective cells. The foregoing three patents are incorporated herein by reference in their entirety.

A problem arises during the operation of a fuel cell in that the cell has electrolyte losses. For instance, as a result of electrolyte volume changes, such as those due to temperature and composition changes, electrolyte can be driven out of the matrix and be permanently lost for use within the matrix. A fuel cell with essentially immobilized electrolyte has limited capacity for the storage of reserve electrolyte therein. Thus, depending on the amount of such storage capacity, there is a limitation on the length of time during which the fuel cell can be operated before shutdown for maintenance. Such maintenance includes the replenishment of the amount of electrolyte in the requisite concentration.

A related problem is found in the distribution of electrolyte in the porous layer between the electrodes. The electrolyte is normally distributed uniformly throughout the porous layer at the time of the construction of the cell. However, later, during operation of the cell, the distribution of the electrolyte can become less uniform. For example, there may be greater losses at the edges of the cell than at the central portion thereof. Even though the porous layer is initially charged completely with electrolyte, there would not be sufficient electrolyte held by the matrix to allow adequate compensation for the selective diminution of electrolyte at various sites along the electrodes and along the layer. In those areas wherein the electrolyte disappears completely, there could even result a space through which the oxygen and the hydrogen can mix with consequential damage to the cell.

An attempted solution of the foregoing problem by the use of larger or smaller pores in such porous layer is of little help in solving this problem. Enlargement of the pore size reduces the capillary forces and, hence, the effectiveness of the layer as a barrier to the mixing of the gaseous reactants. Reduction of the pore size reduces the liquid transport rate and, hence, diminishes the possibility of maintaining uniform distribution of the electrolyte.

Additional problems arise from the complexity of the structure required to lead the electrolyte in from a region of storage to the region of electrochemical activity alongside the layers of the catalyst. Such electrolyte lead-in structures are described in the foregoing Bushnell patent. In particular, it is noted that such structures tend to increase the size of the cell, to increase resistance losses associated with the flow of electronic current, and to decrease the surface area available for the electrochemical reactions.

Many of the foregoing problems were solved as disclosed in U.S. Pat. No. 4,467,019, and pending U.S. patent application Ser. No. 568,619. The problems were solved by constructing a fuel cell of a laminated structure wherein the electrodes are spaced apart by a matrix assembly with layers of varying porosities. As disclosed therein, the matrix assembly is composed of a central layer having relatively large pores comprising a conducting carbon fiber material. This layer is sandwiched between two outer non-conducting layers having relatively small pores.

While such construction solves many of the problems discussed above, it too has its problems. Since the central layer of the matrix is composed of a conducting material, it is preferably sandwiched by at least two non-conducting layers to minimize the possibility of electronic short circuits that arise from stray fibers penetrating through the outer layers to the surface of the electrode. Because of the overall thickness of the three layer matrix, there are relatively large internal resistance losses, which result in a decreased cell performance.

SUMMARY OF THE INVENTION

The foregoing problems are overcome and other advantages are provided by a fuel cell constructed in accordance with the present invention. The fuel cell of the present invention comprises a laminated structure wherein the electrodes are spaced apart by a matrix assembly comprising a non-conducting fibrous layer having a relatively large void-fraction and at least one non-conducting layer having a relatively small void-fraction.

In the preferred embodiment of the invention, the non-conducting fibrous layer is formed of silicon carbide whiskers and the relatively small void-fraction layer comprises a non-fibrous material such as silicon carbide powder. The non-conducting fibrous layer is laminated onto either electrode and the relatively small pore layer is laminated onto the other electrode, the two layers together forming the matrix assembly. Preferably the relatively small void-fraction layer is laminated onto the anode. Since both layers are non-conducting there is no need for a third or fourth non-conducting layer that may otherwise be required to minimize the possibility of electronic short circuits. By placing the matrix assembly between the two electrodes, the matrix assembly can serve to supply electrolyte to the space between the anode and the cathode while fluidic gaseous reactants are supplied to the exterior sides of the electrodes, hydrogen being provided to the anode and oxygen being provided to the cathode. The placement of the electrolyte between the two electrodes provides for an ionically conducting path whereby the hydrogen ions propagate from the anode to the cathode while the electrons travel from the anode to the cathode via an external circuit to which the fuel cell is coupled.

The relatively large void-fraction of the non-conducting fibrous layer and its network fibrous structure permit the holding and distribution of electrolyte among various locations within the layer. It thus provides a means for the internal distribution of electrolyte without added complexity to the cell structure. The use of complex structures for the distribution and storage of electrolyte within the cell is thus avoided. The relatively small void-fraction layer has a compact pore structure and draws electrolyte by capillary action from the fibrous non-conducting layer and strongly holds the electrolyte. Because the electrolyte is tightly held within the relatively small void-fraction layer, it serves as a barrier to the permeation of the gaseous reactants. Thus, for example, hydrogen from the anode side of the cell cannot permeate through the small void-fraction layer to contact any oxygen which may have permeated through the fibrous layer.

Since both matrix assembly layers are non-conducting, only two layers are required. As a result, the thickness of the matrix assembly is reduced when compared with the prior art matrix assembly, resulting in lower resistance losses. The cell constructed in this manner exhibits surprisingly superior performance over and above the increased performance expected from the lower internal resistance losses. The reason for this surprisingly superior performance is not completely understood.

In accordance with a further feature of the invention, an external reservoir holds electrolyte and is connected via a feed means such as tubing to the non-conducting fibrous layer for replenishment of electrolyte. The addition of electrolyte from the external reservoir to the matrix assembly in the cell compensates for changes in content of electrolyte within the cell. The non-conducting fibrous layer must have good in-plane transport properties to uniformly distribute the electrolyte.

BRIEF DESCRIPTION OF THE DRAWING

The aforementioned aspects and other features of the invention are explained in the following description taken in connection with the accompanying drawings wherein.

DETAILED DESCRIPTION OF THE INVENTION

Figure 1:
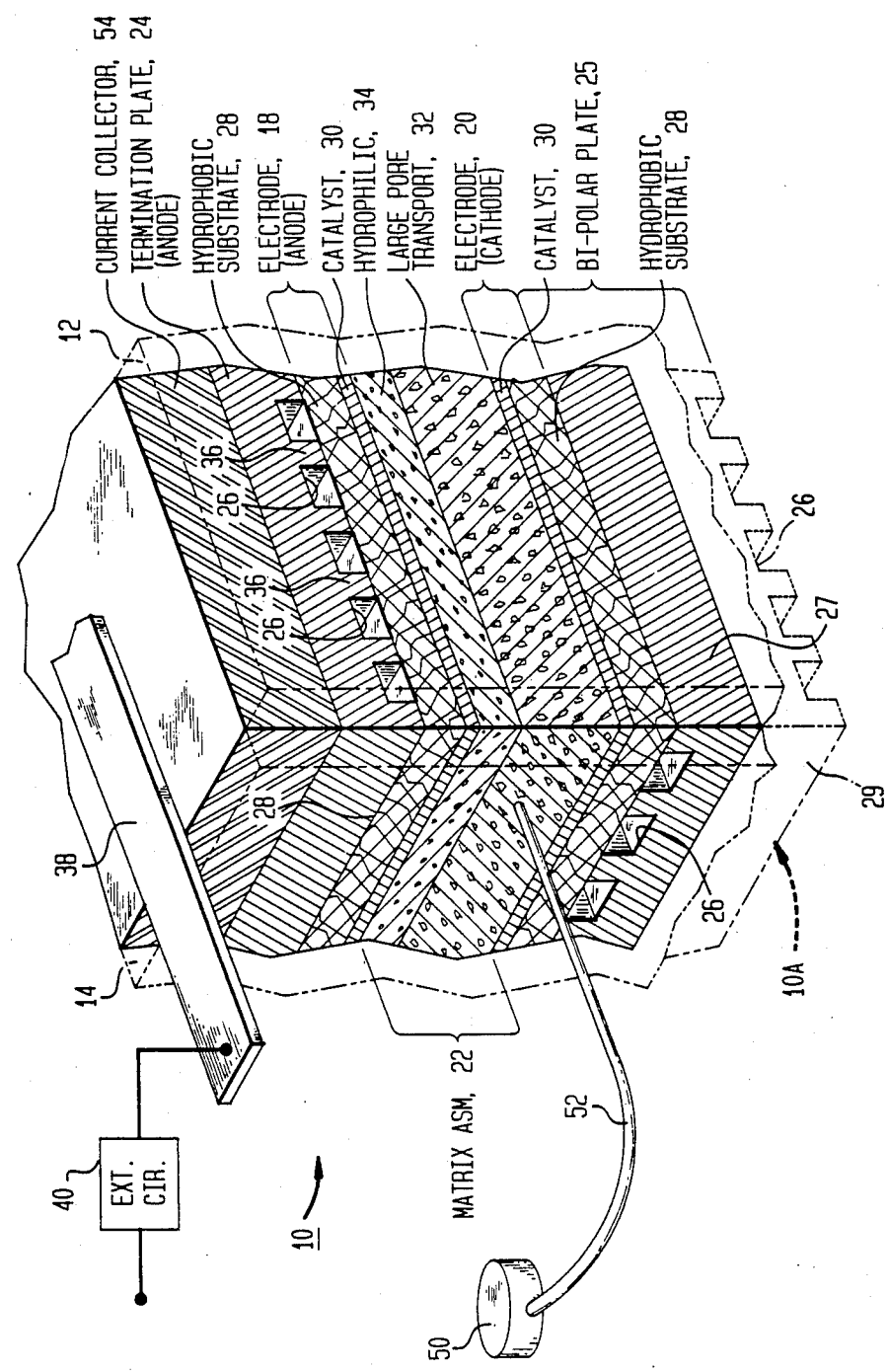
FIG. 1 shows a perspective view of a portion of a stack of fuel cells in an assembly of such fuel cells, the portion comprising one complete fuel cell with a second cell being partially shown in phantom and the fuel cell being sectioned to identify the individual layers thereof.

The fuel cell of the present invention is represented generally by reference numeral 10 in FIG. 1. A part of a second fuel cell 10A, having the same construction as the cell 10, is shown in phantom and is placed contiguous to the cell 10, as would be the case if the cell 10 is understood to be one of many such cells which would ordinarily be placed in a stack (not shown). Connections of the cells 10 and 10A via manifolds for the conveyance of reactants are shown schematically. Two such representative manifolds are shown in phantom; a manifold 12 for the conveyance of hydrogen to the anode of respective cells of the stack and a manifold 14 for the conveyance of oxygen to the cathode of the respective cells of the stack.

The fuel cell 10 comprises two electrodes; an anode 18 and a cathode 20 which are separated by an electrolyte matrix assembly 22. Each electrode abuts an impermeable gas distribution plate. At the top of the cell, which cell is at the top of the fuel cell stack, there is located a gas distribution plate 24 having grooves 26 to bring in and distribute a single reactant. A current collector 54 is disposed on top of plate 24. At the other end of the cell there is a bipolar plate 25 composed of two separate plates 27 and 29 in back-to-back relationship to supply reactants to the cell 10 shown and the adjacent cell 10A (not completely shown).

The plates 24 and 25 have passages 26 for the entry of gaseous reactants, which also serve to carry out reaction products from the cell. The bipolar plate 25 provides an electronic interconnection of the two adjacent cells 10 and 10A. Each electrode comprises a hydrophobic substrate layer 28 and a catalyst 30.

The matrix assembly 22 comprises a first permeable layer 32 having a relatively large void-fraction and a second permeable layer 34 having a relatively small void-fraction. Layer 32 is formed of a non-conducting fibrous material. It is presently preferred to employ silicon carbide whiskers although other suitable non-conducting fibrous materials such as aluminum nitride may be employed. Examples of suitable silicon carbide whiskers that may be employed are TOKAMAX® manufactured by Tokai Carbon Co., Ltd. and NICALON® manufactured by Nippon Carbon Co., Ltd. Layer 32 is formed by first mixing silicon carbide whiskers with a fluoropolymer dispersion and water to form a paste and thereafter applying the paste to the catalyst surface of either electrode 18 or 20 although it is presently preferred to apply it to electrode 20. The paste may be applied by a suitable method including screen printing and blade coating although blade coating is presently preferred. The coated electrode is then dried and heat cured, preferably by air drying overnight followed by curing in an oven at 290° C. for five minutes. Layer 32 is formed to a thickness of from about 0.003 to 0.005 inches, preferably about 0.003 inches and has a void-fraction of from about 75%–90%, preferably 80%–85%. An electrolyte, typically phosphoric acid, is contained in layer 32. However, other suitable electrolytes may be employed because of its relatively large void-fraction and fibrous network structure; layer 32 permits the electrolyte to freely migrate there through so as to replenish the electrolyte within the cell 10 as may be required. Layer 32 need not necessarily be completely filled with the electrolyte, it being necessary only to provide sufficient electrolyte to insure efficient ionic conductance between the electrodes 18 and 20.

Layer 34 exerts a capillary force resulting from its compact pore structure which draws in the electrolyte from layer 32 to completely fill the layer 34. Preferably, the average pore size of layer 34 is less than about 1.0 μm. The structure of layer 34 also prevents the migration of gases thus assuring that the hydrogen from the anode does not meet and mix with the oxygen from the cathode. Hence, even if oxygen should migrate through layer 32 it would be prevented by layer 34 from contacting the hydrogen at the anode side.

Layer 34 of the matrix assembly 22 is preferably formed of silicon carbide powder bonded with PTFE particles. A minimal amount, necessary only for bonding, is all that is used to ensure that the layer does not become hydrophobic. Preferably the silicon carbide is mixed with a dispersion of Teflon (polytetrafluoroethylene) and an inking vehicle such as polyethylene oxide. The mixture is applied to the catalyst side of the electrode and then smoothed such as by a blade. The mixture is dried and sintered. The above described process produces a material having a void-fraction of from about 40%–55%, preferably about 45%–50% and an average pore size of less than about 1.0 μm. While silicon carbide powder is disclosed above, any suitable material can be used to form layer 34. Layer 34 is formed to a thickness of from about 0.004 to 0.006 inches, resulting in a maximum overall matrix assembly thickness of about 0.007 to 0.011 inches.

The electrolyte is added to the layers 32 and 34 during assembly of the cell. The matrix assembly 22 with the electrolyte therein serves as a path by which positive hydrogen ions can migrate via ionic current transport from anode 18 to the cathode 20. As described, the matrix assembly is constructed in such a manner which permits the migration of electrolyte within the assembly while at the same time substantially immobilizing the electrolyte within the matrix so as to prevent the electrolyte from freely flowing out of the matrix. The electrolyte is permitted to flow out of matrix only by means of capillary action.

The porosity of the hydrophobic layer 28 is characterized by large pores through which the gaseous reactants can freely circulate so as to propagate from the passages 26 to the catalyst 30. Thus, the catalyst 30 is surrounded by hydrophobic and hydrophilic layers, the hydrophobic layer facing the gaseous reactants and the hydrophilic layer facing the electrolyte.

The hydrophobic layer 28 in each electrode is impregnated with fluoropolymer such as a fluorinated ethylenepropylene to prevent the electrolyte from flooding into the electrode. This is an advantageous feature in the construction of the cell 10 since such flooding, if permitted, would reduce the number of open pores through which the gaseous reactants must pass in the electrodes. A reduced number of available pores would result in a diminution in the capacity of the cell to produce electricity.

The hydrophobic layer 28 brings gaseous reactant into contact with the catalyst 30 while the hydrophilic layer 34 brings the electrolyte into contact with the catalyst 30. Thereby, respective electrochemical reactions can take place at the catalyst 30 of the anode 18 and at the catalyst 30 of the cathode 20. The catalyst 30 is conveniently formed of a precious metal, such as platinum, with or without other metals such as chromium, iron, vanadium, gallium, which, for the purpose of bonding and partial wet-proofing, is mixed with a fluoropolymer and deposited onto the hydrophobic layer 28. The catalyst 30 may also contain suitable support materials for the precious metal such as carbon and graphite. The same construction may be utilized in each of the electrodes 18 and 20. Each of the catalysts 30 the hydrophobic layers 28, and the plates 24 and 25 is electronically conducting. Thus, in the case of the anode 18, electrons released by the electrochemical reaction can propagate from the catalyst 30 through the fibrous carbon of the hydrophobic layer 28 and into the partitions of ribs 36 of the plate 24 which separate the respective passages 26.

In the series arrangement depicted in the FIG. 1, the electrons from the anode of one cell are conducted directly to the cathode of the adjoining cell. An exemplary stack termination contact 38 is shown attached by conventional methods to the current collector 54. The contact 38 is coupled to an external circuit 40 (indicated in block diagrammatic form) while the other terminal of the external circuit 40 is coupled to a similar contact (not shown) at the opposite end of the stack of the fuel cells. The electrons can, thereby, make a complete circuit from the negative terminal of the stack (the last of the anodes) via the external circuit 40 to the positive terminal of the stack (the first of the cathodes). Correspondingly, the hydrogen ions can migrate in each cell through the electrolyte contained in the matrix assembly proceeding from the anode of the cell through the matrix assembly to the cathode of the cell.

In operation, hydrogen is admitted through the manifold 12 to the passages 26 into the anodes 18 of each cell in the stack. Oxygen is admitted through the manifold 14 into the passages 26 adjacent cathodes 20 in each of the cells of the stack. By capillary action, the electrolyte is brought into contact with the catalyst 30 in each of the electrodes 18 and 20. The hydrogen propagates from the passages 26 through the pores of the hydrophobic layer 28 to the catalyst 30 in the anode 18. The oxygen propagates from the passages 26 through the hydrophobic layer 28 to the catalyst 30 in the cathode 20. Thereby, the hydrogen and the electrolyte are placed in contact with each other at the interface of the catalyst 30 at the anode 18 and the oxygen and the electrolyte are placed in contact with each other at the interface of the catalyst 30 of the cathode 20. It is in these locations of the cell that the respective electrochemical reactions to produce electricity occur. In order to prevent the migration of oxygen to the manifold containing hydrogen and the migration of hydrogen to the manifold carrying oxygen, the edges of each of the electrodes 18 and 20 may be sealed with, for example, wet-seal strips or gaskets (not shown).

The reservoir 50 is located outside the cell and is coupled to layer 32 by any suitable feed means such as by tube 52 which serves as an electrolyte conducting means. The reservoir may also be located within either manifold. With this arrangement, electrolyte can be fed from reservoir 50 through the tube 52 and to and into cell 10 via layer 32 without any interference with the flow of reactant gases in the cell. The feed means can extend into and across the layer 32. The connection of tube 52 with the layer 32 can be accomplished with the aid of a wet seal strip (not shown) to prevent leakage of electrolyte. In an alternative embodiment, the feed means can be a material having wicking properties such as carbon yarn.

The height of the reservoir 50 can be adjusted to provide a hydrostatic pressure on the electrolyte in the cell as it flows from the reservoir to the cell. Any suitable means, however, can be used for externally replenishing electrolyte to the cell as needed.

The losses of electrolyte in the region between the electrodes may occur during operation of the cell 10 and, if not compensated for, can cause a reduction in the cell's output of electricity or cell burn out. By use of reservoir 50, frequent shutdowns of the cell stack are not required to maintain the proper level of electrolyte in the layers 34 of the cells.

Details on the construction of the respective layers of the cell 10 other than layers 32 and 34 described above are well known, and are described, by way of example, in U.S. Pat. Nos. 3,453,149, 4,064,322 and 4,175,165, incorporated herein by reference. These patents describe the construction of cells utilizing porous material with impregnations of PTFE and coatings of precious metal catalysts. The dual morphology characteristic of the matrix assembly 22 provides for the hydrophilic properties of the layer 34 while utilizing the larger void-fraction and fibrous network structure of layer 32 for holding the electrolyte and distributing it so as to maintain the electrolytic saturation of the layer 34 during operation of the cell 10. In addition, the presence of the electrolyte in both layers of the matrix assembly 22 provides the requisite conduction path for the hydrogen ions.

Thus, the matrix assembly 22 of the invention, of itself, permits the cell 10 to operate normally while maintaining the uniform distribution of electrolyte therein. The matrix assembly 22 also permits cell 10 to operate normally in conjunction with the external reservoir 50 for maintaining the uniform distribution of electrolyte.

Figure 2:
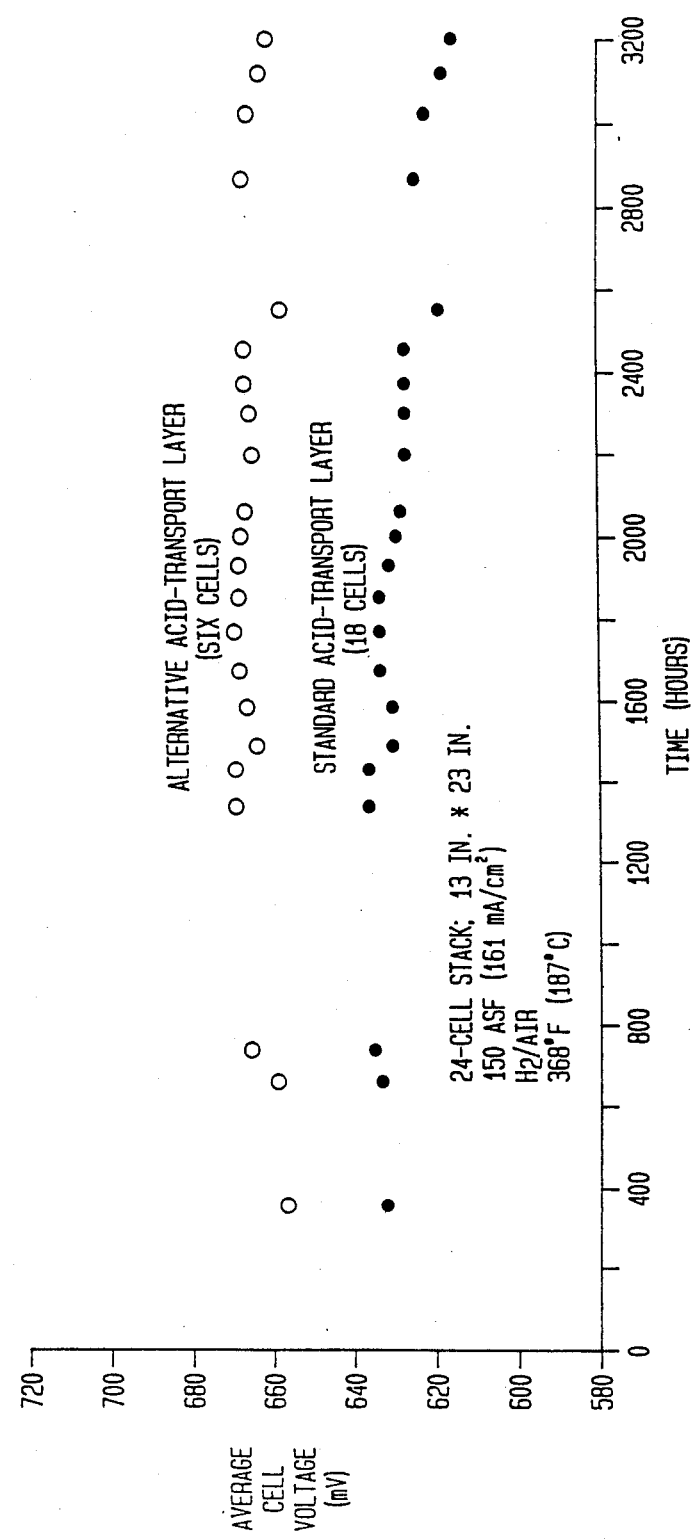
FIG. 2 is a graph comparing the performance of the cell of the present invention with that of a cell of the prior art.

The resulting cell exhibits unexpectedly superior performance in comparison to the prior art cells. Although it would be expected that the cell of the present invention would exhibit improved performance in comparison to the prior art cells because of the lower internal resistance losses, the improved performance far exceeds what would normally be expected. Thus, the internal resistance losses were measured for eighteen cells of a stack manufactured as described in U.S. Pat. No. 4,467,019 and U.S. application Ser. No. 568,619. The average internal resistance loss was 61 millivolts at 150 amps/ft$^2$ (current density). The average internal resistance loss for six cells manufactured with silicon carbide whiskers according to the present invention was measured to be 55 millivolts at 150 amps/ft$^2$ (current density). Based on these results, a 6 mv improvement in performance would have been expected. Surprisingly, the measured improvement in performance ranged from about 25–45 mv. See FIG. 2. The reason for such a dramatic improvement in performance because of the use of a non-conductive fibrous layer instead of the conducting layer of the prior art is not completely understood.

Examples describing the formation of layer 32 of the matrix assembly are set forth below.

EXAMPLE 1

1 g. of polyethyleneoxide powder was dissolved in 100 ml. of distilled water. Then, 40 g. of the above solution were slowly poured over 12 g. of silicon carbide whiskers (Tokamax ® manufactured by Tokai Carbon Co., Ltd.) in a 250 ml. beaker while stirring with a rubber spatula and then mixed thoroughly. Thereafter, 0.7 ml. of concentrated TFE fluoropolymer dispersion (TFE-30 manufactured by DuPont) was added and mixed thoroughly with a rubber spatula. Then, the electrode to be coated was placed on a flat surface with the catalyst layer facing up. Shims (spacers) were placed alongside the electrode to a height of 0.005 inches above the surface of the electrode. The paste obtained from the above procedure was poured onto the electrode, and spread uniformly over the electrode using a rubber coated steel blade in contact with the above shims. The coated electrode was allowed to dry in air overnight and then placed in an oven at 290° C. for five minutes to cure.

EXAMPLE 2

First, 1 g. of polyethyleneoxide powder was dissolved in 100 ml. of distilled water. Then, 82 g. of the above solution was slowly poured over 13 g. of silicon carbide whiskers (same as in Example 1) in a 250 ml. beaker while stirring with a rubber spatula. The mixture was then mixed thoroughly. Thereafter, 0.5 ml. of concentrated TFE fluoropolymer dispersion (TFE-30 manufactured by DuPont) was added and mixed thoroughly again with a rubber spatula. The mixture was then rolled on a three roll mill for ten minutes to obtain a uniform and thorough mixture. An electrode with its catalyst surface facing up was laid flat. Shims (spacers) were placed alongside the electrode to a height of 0.005 inches above the surface of the electrode and the paste obtained from the above described procedure was spread uniformly over the electrode using a rubber coated steel blade in contact with the shims. The coated electrode was allowed to dry in air overnight and then cured in an oven at 290° C. for five minutes.

It is to be understood that the above described embodiments of the invention are illustrative only, and that modifications thereof may occur to those skilled in the art. Accordingly, this invention is not to be regarded as limited to the embodiments as disclosed herein, but is to be limited only as defined by the appended claims.

We claim:

1. A fuel cell having catalytic electrodes and an electrolyte wherein electrochemical reactions take place between fluidic reactants, and a matrix assembly for retaining and distributing electrolyte within the cell, said matrix assembly comprising at least two layers of material, said first layer of material comprising a non-conducting material having a relatively small void-fraction, said second layer comprising a non-conducting fibrous material having a relatively large void-fraction, said matrix assembly serving as an ionically conducting path between the electrodes and as a means for supplying electrolyte to said electrodes for electrocatalytic reaction.

2. The fuel cell according to claim 1, wherein the second layer of the matrix comprises a whisker material.

3. The fuel cell according to claim 1, wherein the second layer of the matrix comprises a material selected from the group consisting of silicon carbide, aluminum nitride and mixtures thereof.

4. The fuel cell according to claim 3, wherein the second layer comprises silicon carbide whiskers.

5. The fuel cell according to claim 1, wherein the first layer of the matrix has a void-fraction of about 40 to 55% and the second layer of the matrix has a void-fraction of about 75 to 90%.

6. The fuel cell according to claim 1, wherein the first layer of material comprises silicon carbide powder.

7. The fuel cell according to claim 1, wherein the matrix assembly is about 0.007 to 0.011 inches thick.

8. The fuel cell according to claim 1, wherein the first layer of material comprises a non-conducting material, said layer having an average pore size of not more than 1.0 $\mu$m.

9. A fuel cell having catalytic electrodes and an electrolyte wherein electrochemical reactions take place between fluidic reactants, and a matrix assembly for retaining and distributing electrolyte within the cell, said matrix assembly comprising at least two layers of material, said first layer of material comprising a non-conducting material having a relatively small void-fraction, said second layer comprising non-conducting silicon carbide whiskers having a relatively large void-fraction, said matrix assembly serving as an ionically conducting path between the electrodes and as a means for supplying electrolyte to said electrodes for electrocatalytic reaction.

* * * * *

UNITED STATES PATENT AND TRADEMARK OFFICE
CERTIFICATE OF CORRECTION

PATENT NO. : 4,751,062
DATED      : June 14, 1988
INVENTOR(S) : A. Kaufman, S. Pudick, C. L. Wang It is certified that error appears in the above—identified patent and that said Letters Patent is hereby corrected as shown below:

In Column 1, line 6 , after the heading "BACKGROUND OF THE INVENTION", please add the following new paragraph: --The Government has rights in this invention pursuant to Contract Number DE-AC01-78ET15366 awarded by the U.S. Department of Energy.--

Signed and Sealed this

Eleventh Day of April, 1989

*Attest:*

DONALD J. QUIGG

*Attesting Officer*   Commissioner of Patents and Trademarks